United States Patent
Conway

(10) Patent No.: US 12,475,149 B2
(45) Date of Patent: Nov. 18, 2025

(54) DATABASE SYSTEMS AND METHODS FOR AUTOMATED CONVERSATIONAL RESPONSES

(71) Applicant: Salesforce, Inc., San Francisco, CA (US)

(72) Inventor: John Conway, Vancouver (CA)

(73) Assignee: Salesforce, Inc.

( * ) Notice: Subject to any disclaimer, the term of this patent is extended or adjusted under 35 U.S.C. 154(b) by 76 days.

(21) Appl. No.: 18/505,988

(22) Filed: Nov. 9, 2023

(65) Prior Publication Data

US 2025/0156453 A1    May 15, 2025

(51) Int. Cl.
  G06F 40/00    (2020.01)
  G06F 16/3329    (2025.01)
  G06F 16/338    (2019.01)
  G06F 40/30    (2020.01)

(52) U.S. Cl.
  CPC ........ G06F 16/3329 (2019.01); G06F 16/338 (2019.01); G06F 40/30 (2020.01)

(58) Field of Classification Search
  None
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |

(Continued)

OTHER PUBLICATIONS

Plu, Julien. Dec. 2018. Knowledge Extraction in WEb Media: At the Frontier of NLP, Machine Learning and Semantics. Telecom Paris Tech. pp. 1-88.*

*Primary Examiner* — Tuankhanh D Phan
(74) *Attorney, Agent, or Firm* — Ingrassia Fisher & Lorenz, LLP

(57) ABSTRACT

Database systems and methods are provided for managing usage of large language models (LLMs). One method involves determining a numerical representation of a conversational input to a user interface, identifying a semantically similar subset of prior conversational inputs based at least in part on the numerical representation of the conversational input, and determining numerical representations of respective conversational responses generated by a language model responsive to the respective prior conversational input of the semantically similar subset. When the numerical representations of the respective conversational responses satisfy a semantic similarity threshold, the method automatically generates an automated response to the conversational input based at least in part on one or more prior conversational responses and automatically provides the automated response to the user interface responsive to the conversational input.

20 Claims, 5 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2021/0406264 A1* | 12/2021 | Nahamoo ............... G06N 5/022 |

* cited by examiner

DATABASE SYSTEMS AND METHODS FOR AUTOMATED CONVERSATIONAL RESPONSES

TECHNICAL FIELD

One or more implementations relate to the field of database systems, and more specifically, to automatically responding to conversational user input.

BACKGROUND

Modern software development has evolved towards web applications and cloud-based applications that provide access to data and services via the Internet or other networks. Businesses also increasingly interface with customers using different electronic communications channels, including online chats, text messaging, email or other forms of remote support. Artificial intelligence (AI) may also be used to provide information to users via online communications with "chatbots" or other automated interactive tools. Using chat-bots, automated AI systems conduct text-based chat conversations with users, through which users request and receive information. Chatbots generally provide information to users for predetermined situations and applications, and in practice, may be limited depending on the nature of the training data utilized to develop the chatbot. Chatbots have been developed using large language models (LLMs) that have access to or knowledge of a larger data set and vocabulary, such that they are more likely to have applicable information for a wide range of potential input prompts. However, LLM-based chatbots are often associated with increased processing and/or storage requirements, such that the costs associated with reliance on LLMs can be prohibitive or otherwise undesirable in certain situations. Accordingly, it is desirable to provide systems and methods capable of leveraging the advantages of LLMs while mitigating costs.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
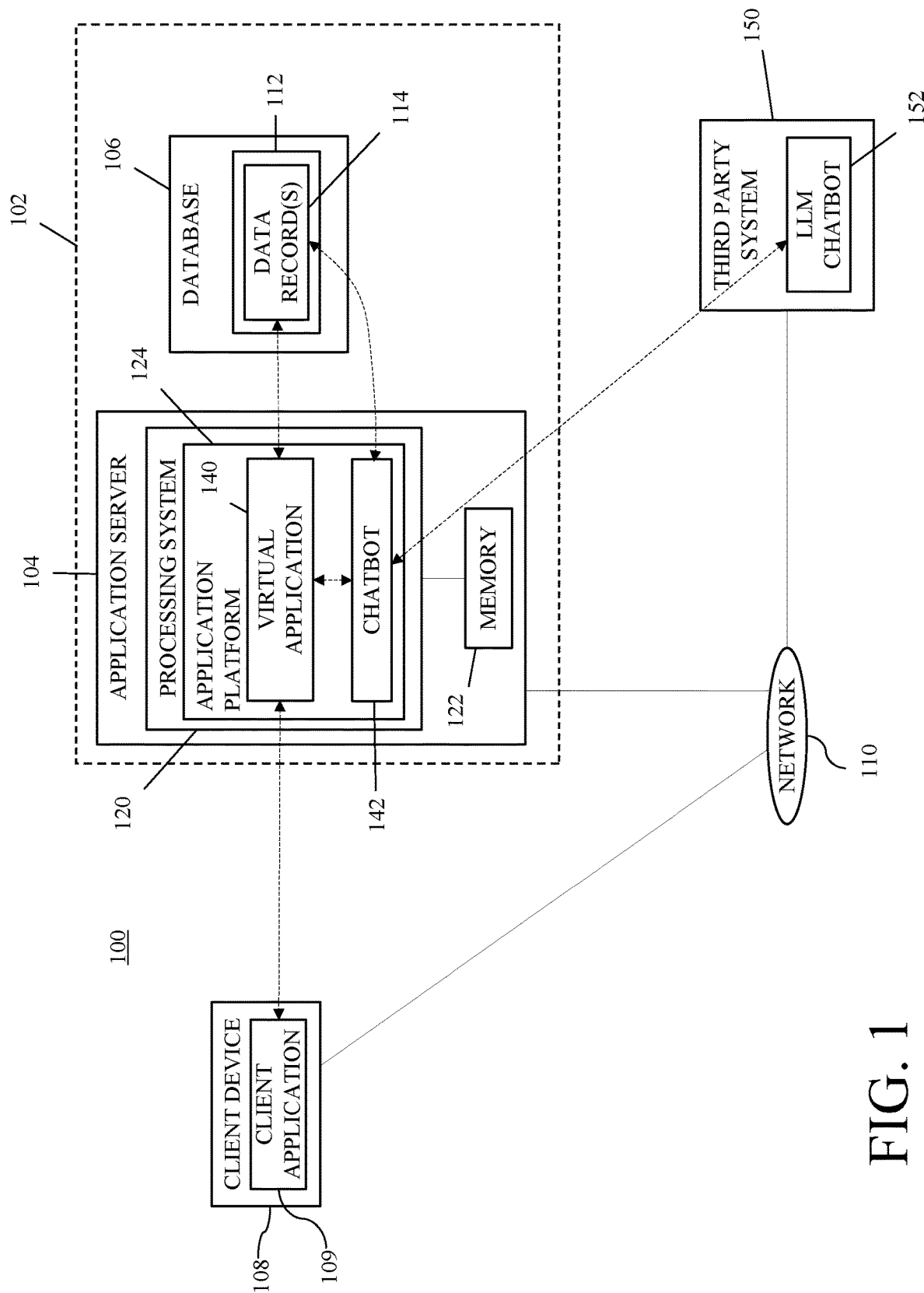
FIG. 1 is a block diagram depicting an exemplary computing system depicting an environment suitable for implementing aspects of the subject matter described herein in accordance with one or more implementations.

The subject matter described herein generally relates to computing systems and methods for automatically generating automated responses to conversational user inputs that emulate or mimic the response that would otherwise likely be provided by a large language model-based chatbot by using prior large language model (LLM) conversational responses associated with prior, semantically-similar conversational user inputs. As described in greater detail below, incoming conversational prompts that are input by or otherwise received from users are compared to conversational prompts that were previously sent to an LLM-based chatbot for automated response generation to identify a semantically similar subset of prior conversational prompts. The prior automated responses generated by the LLM-based chatbot for those semantically similar prior conversational prompts are analyzed for semantic similarity across the prior automated responses. When the prior automated responses for the semantically similar prior conversational prompts corresponding to a current conversational prompt of interest are semantically similar enough (e.g., within some calibratable threshold), the prior automated responses to those semantically similar prior conversational prompts are utilized to automatically generate or otherwise construct a conversational response to the current conversational prompt of interest. In this manner, an automated response to the current conversational prompt that emulates an LLM-based response may be automatically generated and provided to the user associated with the current conversational prompt without sending the current conversational prompt to an LLM-based chatbot, thereby saving computational resources and other temporal and/or monetary costs that would otherwise be associated with use of an LLM-based chatbot by bypassing the LLM-based chatbot when the input prompt is likely to result in a response that is semantically similar to previously received responses to the same or similar input prompt.

In exemplary implementations, to identify a semantically similar subset of prior conversational user inputs, the current conversational user input to a user interface is input to an encoder or other model or algorithm that generates a corresponding numerical vector or other numerical representation of the conversational user input. The numerical representation of the current conversational user input is compared to the corresponding numerical representations of the prior conversational user inputs previously submitted to an LLM-based chatbot to identify the semantically similar subset prior conversational user inputs, for example, by using cosine similarity and/or applying a clustering technique or algorithm to identify a cluster group of semantically similar prior conversational user inputs having numerical vector representations that are within a threshold distance of the numerical vector representation of the current conversational user input. The prior LLM-based chatbot conversational responses associated with that semantically similar subset prior conversational user inputs are similarly encoded or otherwise converted to numerical representations, which, in turn, may be analyzed to determine whether the prior LLM-based chatbot conversational responses satisfy a semantic similarity threshold for automated response generation (e.g., whether a silhouette score associated with the cluster of numerical vector representations of the prior LLM-based chatbot conversational responses is greater than a threshold silhouette score). When the prior LLM-based chatbot conversational responses are semantically similar enough, the textual or conversational content of the prior LLM-based chatbot conversational responses is then utilized to automatically generate or otherwise construct a response to the current conversational user input.

In one or more exemplary implementations, the conversational user inputs and responses described herein are unstructured and free form using natural language that is not constrained to any particular syntax or ordering of speakers or utterances thereby. In this regard, an utterance should be understood as a discrete uninterrupted chain of language provided by an individual conversation participant or actor or otherwise associated with a particular source of the content of the utterance, which could be a human user or speaker (e.g., a customer, a sales representative, a customer support representative, a live agent, and/or the like) or an automated actor or speaker (e.g., a "chat-bot" or other automated system). For example, in a chat messaging or text messaging context, each separate and discrete message that originates from a particular actor that is part of the conversation constitutes an utterance associated with the conversation, where each utterance may precede and/or be followed by a subsequent utterance by the same actor or a different actor within the conversation. In this regard, the conversational user input that functions as the input prompt for which an automated response is to be generated may be constructed from one or more utterances by the same actor within a conversation, and is not necessarily limited to an individual message or utterance. Additionally, it should be noted that although the subject matter may be described herein in the context of conversations (e.g., chat logs, text message logs, call transcripts, comment threads, feeds and/or the like) for purposes of explanation, the subject matter described herein is not necessarily limited to conversations and may be implemented in an equivalent manner with respect to any particular type of database record or database object including text fields.

FIG. 1 depicts an exemplary depicts an exemplary computing system 100 including a database system 102 configurable to provide an application platform 124 capable of supporting conversational interactions with a user of a client device 108. In exemplary implementations, the database system 102 capable of provisioning instances of one or more virtual applications 140 to client applications 109 at client devices 108 over a communications network 110 (e.g., the Internet or any sort or combination of wired and/or wireless computer network, a cellular network, a mobile broadband network, a radio network, or the like), where the virtual applications 140 invoke, include or otherwise incorporate a conversational interaction service 142 that is configurable to support conversational interactions and interface with an LLM-based chatbot service 152, as described in greater detail below. For purposes of explanation, the conversational interaction service 142 may alternatively be referred to herein as a chatbot service in the context of an exemplary implementation providing substantially real-time conversational interactions with an end user the context of a chat window associated with an instance of the virtual application 140, however, it should be appreciated that the subject matter described herein is not limited to chatbots and the conversational interaction service 142 may be configurable to support any number of different types or forms of conversational interactions in an automated manner (e.g., by automatically generating responsive emails, text messages, and/or the like). Accordingly, it should be appreciated that FIG. 1 is a simplified representation of a computing system 100 and is not intended to be limiting.

In one or more exemplary implementations, the database system 102 includes one or more application servers 104 that support an application platform 124 capable of providing instances of virtual web applications 140, over the network 110, to any number of client devices 108 that users may interact with to view, access or obtain data or other information from one or more data records 114 maintained in one or more data tables 112 at a database 106 or other repository associated with the database system 102. For example, a database 106 may maintain, on behalf of a user, tenant, organization or other resource owner, data records 114 entered or created by that resource owner (or users associated therewith), files, objects or other records uploaded by the resource owner (or users associated therewith), and/or files, objects or other records automatically generated by one or more computing processes (e.g., by the server 104 based on user input or other records or files stored in the database 106). In this regard, in one or more implementations, the database system 102 is realized as an on-demand multi-tenant database system that is capable of dynamically creating and supporting virtual web applications 140 based upon data from a common database 106 that is shared between multiple tenants, which may alternatively be referred to herein as a multi-tenant database. Data and services generated by the virtual web applications 140 may be provided via the network 110 to any number of client devices 108, as desired, where instances of the virtual web application 140 may be suitably generated at run-time (or on-demand) using a common application platform 124 that securely provides access to the data in the database 106 for each of the various tenants subscribing to the multi-tenant system.

The application server 104 generally represents the one or more server computing devices, server computing systems or other combination of processing logic, circuitry, hardware, and/or other components configured to support remote access to data records 114 maintained in the data tables 112 at the database 106 via the network 110. Although not illustrated in FIG. 1, in practice, the database system 102 may include any number of application servers 104 in concert with a load balancer that manages the distribution of network traffic across different servers 104 of the database system 102.

In exemplary implementations, the application server 104 generally includes at least one processing system 120, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 104 may also include one or more communications interfaces, which include any number of transmitters, receiver, transceivers, wired network interface controllers (e.g., an Ethernet adapter), wireless adapters or another suitable network interface that supports communications to/from the network 110 coupled thereto. The application server 104 also includes or otherwise accesses a data storage element 122 (or memory), and depending on the implementation, the memory 122 may be realized as a random access memory (RAM), read only memory (ROM), flash memory, magnetic or optical mass storage, or any other suitable non-transitory short or long term data storage or other computer-readable media, and/or any suitable combination thereof. In exemplary implementations, the memory 122 stores code or other computer-executable programming instructions that, when executed by the processing system 120, are configurable to cause the processing system 120 to support or otherwise facilitate the application platform 124 and related software services that are configurable to subject matter described herein.

The client device 108 generally represents an electronic device coupled to the network 110 that may be utilized by a user to access an instance of the virtual web application 140 using an application 109 executing on or at the client device 108. In practice, the client device 108 can be realized as any sort of personal computer, mobile telephone, tablet or other network-enabled electronic device coupled to the network 110 that executes or otherwise supports a web browser or other client application 109 that allows a user to access one or more GUI displays provided by the virtual web application 140. In exemplary implementations, the client device 108 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 108. Some implementations may support text-to-speech, speech-to-text, or other speech recognition systems, in which case the client device 108 may include a microphone or other audio input device that functions as the user input device, with a speaker or other audio output device capable of functioning as an output device. The illustrated client device 108 executes or otherwise supports a client application 109 that communicates with the application platform 124 provided by the processing system 120 at the application server 104 to access an instance of the virtual web application 140 using a networking protocol. In some implementations, the client application 109 is realized as a web browser or similar local client application executed by the client device 108 that contacts the application platform 124 at the application server 104 using a networking protocol, such as the hypertext transport protocol secure (HTTPS). In this manner, in one or more implementations, the client application 109 may be utilized to access or otherwise initiate an instance of a virtual web application 140 hosted by the database system 102, where the virtual web application 140 provides one or more web page GUI displays within the client application 109 that include GUI elements for interfacing and/or interacting with records 114 maintained at the database 106.

In exemplary embodiments, the database 106 stores or otherwise maintains data for integration with or invocation by a virtual web application 140 in objects organized in object tables 112. In this regard, the database 106 may include any number of different object tables 112 configured to store or otherwise maintain alphanumeric values or other descriptive information that define a particular instance of a respective type of object associated with a respective object table 112. For example, the virtual application may support a number of different types of objects that may be incorporated into or otherwise depicted or manipulated by the virtual application, with each different type of object having a corresponding object table 112 that includes columns or fields corresponding to the different parameters or criteria that define a particular instance of that object. In some implementations, the database 106 stores or otherwise maintains application objects (e.g., an application object type) where the application object table 112 includes columns or fields corresponding to the different parameters or criteria that define a particular virtual web application 140 capable of being generated or otherwise provided by the application platform 124 on a client device 108. In this regard, the database 106 may also store or maintain graphical user interface (GUI) objects that may be associated with or referenced by a particular application object and include columns or fields that define the layout, sequencing, and other characteristics of GUI displays to be presented by the application platform 124 on a client device 108 in conjunction with that application 140.

In exemplary implementations, the database 106 stores or otherwise maintains additional database objects for association and/or integration with a virtual web application 140, which may include custom objects and/or standard objects. For example, an administrator user associated with a particular resource owner may utilize an instance of a virtual web application 140 to create or otherwise define a new custom field to be added to or associated with a standard object, or define a new custom object type that includes one or more new custom fields associated therewith. In this regard, the database 106 may also store or otherwise maintain metadata that defines or describes the fields, process flows, workflows, formulas, business logic, structure and other database components or constructs that may be associated with a particular application database object. In various implementations, the database 106 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables 112 (e.g., in response to creation, changes, or updates to a record in an object table 112).

Still referring to FIG. 1, in exemplary implementations, the code or other programming instructions associated with the application platform 124 and/or the virtual web applications 140 may be configurable to incorporate, invoke or otherwise include a chatbot service 142, which generally represents a software component capable of providing or otherwise supporting an automated agent or chatbot service capable of exchanging chat messages or providing other conversational responses, which may include text-based messages that include plain-text words only, and/or rich content messages that include graphical elements, enhanced formatting, interactive functionality, or the like. Depending on the implementation, the chatbot service 142 can be integrated with or otherwise incorporated as part of the virtual application 140, or be realized as a separate or standalone process, application programming interface (API), software agent, or the like that is capable of interacting with the client device 108 independent of the virtual application 140. In practice, the chatbot service 142 may incorporate or otherwise reference a vocabulary of words, phrases, phonemes, or the like associated with a particular language that supports conversational interaction with the user of the client device 108. For example, the vocabulary may be stored or otherwise maintained at the database system 102 (e.g., in the database 106 or memory 122) and utilized by the chatbot service 142 to provide speech recognition or otherwise parse and resolve text or other conversational input received via a graphical user interface (GUI) or chat window associated with the chatbot service 142, as well as to generate or otherwise provide conversational output (e.g., text, audio, or the like) to the client device 108 for presentation to the user (e.g., in response to received conversational input).

In exemplary implementations, the chatbot service 142 receives or otherwise obtains a conversational input from a user of the client device 108 (e.g., via client application 107 and network 110) and parses the conversational input using the conversational vocabulary associated with the chatbot service 142 to identify or otherwise discern an intent of the user or another action that the user would like to perform and automatically respond in a corresponding manner, including by updating the chat window or other GUI display associated with the conversation with the chatbot service 142 to include a graphical representation of a conversational response generated by the chatbot service 142 responsive to the conversational user input prompt received from the user. In this manner, a user of a client device 108 interacts or otherwise communicates with the chatbot service 142 via an associated GUI display within the client application 109 (e.g., a chat window) to transmit or otherwise provide conversational user input in the context of a conversation with the chatbot service 142. Depending on the implementation, the conversational input may be received by the user selecting or otherwise activating a GUI element presented within the chat window, or the user may input (e.g., via typing, swiping, touch, voice, or any other suitable method) a conversational string of words in a free-form or unconstrained manner, which is captured by a user input device of the client device 108 and provided over the network 110 to the application platform 124 and/or the chatbot service 142 via the client application 109. The chatbot service 142 then parses or otherwise analyzes the conversational input using natural language processing (NLP) to identify the intent or other action desired by the user based on the content, syntax, structure and/or other linguistic characteristics of the conversational input.

In one or more implementations, when the chatbot service 142 determines it is unable to ascertain the intent of a received conversational user input or is otherwise unable to respond to the received conversational user input based on the vocabulary and/or other data that is accessible to or otherwise associated with the chatbot service 142, the chatbot service 142 analyzes the received conversational user input to determine whether or not to forward the received conversational user input as an input prompt to a LLM-based chatbot service 152 for generating a corresponding LLM-based automated conversational response to the received conversational user input. In this regard, the LLM-based chatbot service 152 may be realized as an application programming interface (API), software agent, or the like that is capable of receiving a textual input prompt and providing a corresponding natural language textual response to the received input prompt using a LLM and corresponding artificial intelligence or machine learning techniques such that the natural language textual response represents a logical and coherent response to the textual input prompt.

In one or more exemplary implementations, the LLM-based chatbot service 152 is hosted or otherwise implemented at an external computing system 150 on the network 110. The external computing system 150 generally includes at least one server communicatively coupled to the network 110 to support access to the LLM-based chatbot service 152. In this regard, in some implementations, the external computing system 150 is physically and logically distinct from the database system 102 and/or the application platform 124. For example, the external computing system 150 may be owned, controlled, or otherwise operated by a third party different from the parties that own, control and/or operate the database system 102 and/or the application platform 124. That said, in other implementations, the external computing system 150 may be affiliated with the same party that owns, controls and/or operates the database system 102 and/or the application platform 124.

Figure 2:
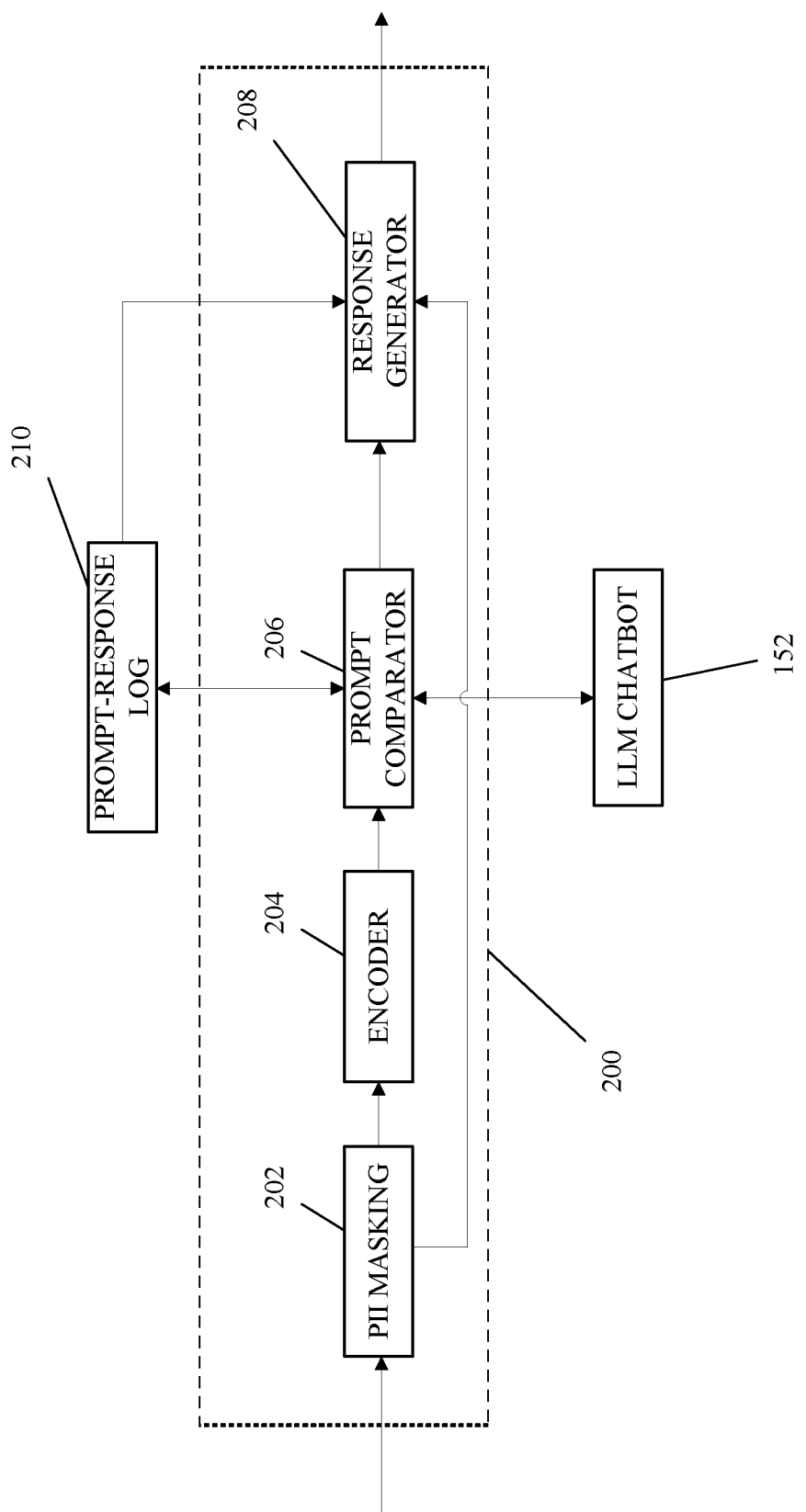
FIG. 2 is a schematic block diagram of an exemplary large language model (LLM) management service suitable for implementation in connection with a chatbot service in the computing system of FIG. 1 in accordance with one or more implementations.

FIG. 2 depicts an exemplary implementation of an LLM management service 200 that may be integrated with, incorporated into, invoked by or otherwise implemented by the chatbot service 142 to analyze or otherwise monitor conversational user inputs received by the chatbot service 142 prior to sending a respective conversational user input to the LLM-based chatbot service 152. In this regard, the depicted components 202, 204, 206, 208 generally represent the configured software components or subprocesses associated with the LLM management service 200 that may be stored or otherwise maintained as code or other executable programming instructions that are executed by a processing system (e.g., processing system 120) in concert with generating the chatbot service 142 associated with a virtual web application 140.

Still referring to FIG. 2 with continued reference to FIG. 1, as described in greater detail below, when the chatbot service 142 determines that a particular conversational user input should be referred to an LLM-based chatbot service 152, for example, based on an inability of the chatbot service 142 to ascertain the intent associated with the conversational user input or otherwise respond using conversational vocabulary associated with the chatbot service 142, the conversational user input may be input or otherwise provided to the LLM management service 200. The LLM management service 200 analyzes the conversational user input relative to prior conversational user input prompts previously sent to the LLM-based chatbot service 152 and corresponding conversational responses previously received from the LLM-based chatbot service 152 to verify or otherwise validate that the conversational user input is likely to receive a substantially unique or distinct conversational response from the LLM-based chatbot service 152 relative to previously received conversational responses. On the other hand, when the LLM management service 200 determines the conversational user input is unlikely to receive a substantially unique or distinct conversational response from the LLM-based chatbot service 152, the LLM management service 200 automatically generates a conversational response that mimics or otherwise emulates the conversational response that would likely be received from the LLM-based chatbot service 152 using the previously received conversational responses, as described in greater detail below.

Still referring to FIG. 2, the LLM management service 200 includes an identification masking component 202 that generally represents the component of the LLM management service 200 that is configurable to parse, scan or otherwise analyze the textual content of a received conversational user input to detect or otherwise identify any personally identifiable information (PII) contained within the received conversational user input and automatically remove or replace any PII terms within the conversational user input. For example, the identification masking component 202 may utilize parts-of-speech tagging or other NLP techniques to identify names or addresses of individuals, organizations, and/or the like contained within the conversational user input and automatically replace any PII terms within the conversational user input with generic nouns or other placeholders that are semantically consistent with the PII terms, resulting in an augmented conversational user input. In various implementations, the identification masking component 202 may tag, store or otherwise maintain data or information identifying the PII terms that were removed from the received conversational user input or otherwise replaced within the augmented conversational user input and provide corresponding indicia to a response generation component 208 (or response generator) for restoring the PII terms in any response to the conversational user input prior to returning that response to the chatbot service 142 and/or virtual web application 140.

After masking any PII terms, in exemplary implementations, the conversational user input is provided to an encoder 204 that is configurable to translate or otherwise convert the conversational user input into a corresponding numerical representation. In this regard, the conversational user input may be input or otherwise provided to a word embedding model, a sentence embedding model, or other NLP model or algorithm that is capable of determining a numerical representation of the conversational user input. For example, in one or more implementations, the encoder 204 may be configurable to convert the conversational user input into a numerical vector space representation of the content of the conversational user input.

The numerical representation of the content of the conversational user input under consideration for being provided as an input prompt to an LLM-based chatbot service 152 is output or otherwise provided to a prompt comparator component 206 which is configurable to compare the numerical representation of the current conversational user input of interest to the past conversational user inputs used for prior input prompts that were previously provided to the LLM-based chatbot service 152 to identify a semantically similar subset of prior input prompts that are within a threshold degree of similarity of the current conversational user input. In this regard, whenever a conversational user input is provided as an input prompt to the LLM-based chatbot service 152, the prompt comparator component 206 or another component of the LLM management service 200 stores or otherwise maintains the conversational user input of that prior input prompt in association with the conversational response received from the LLM-based chatbot service 152 for that prior input prompt in a log 210 that maintains an association between prior input prompts to the LLM-based chatbot service 152 and the prior conversational responses received from the LLM-based chatbot service 152 for those input prompts. In one or more implementations, the prompt-response log 210 is maintained as one or more tables 112 in the database 106, where the prompt comparator component 206 or another component of the LLM management service 200 creates or otherwise instantiates an LLM response data record (e.g., one of data records 114) in the appropriate table(s) 112 in the database 106 to maintain an association between the conversational user input or other textual content of the prior input prompt to the LLM chatbot, the textual content of the conversational response provided by the LLM chatbot for that prior input prompt, and potentially other contextual information associated with the prior input prompt (e.g., indicia of the user, organization, tenant, virtual web application, and/or the like associated with the prior input prompt). In this regard, in addition to maintaining the textual content of the prior input prompt and the prior conversational response, the LLM response data record may also store or otherwise maintain the corresponding numerical representations of the prior input prompt and the prior conversational response (e.g., by inputting the textual content of the prior input prompt and the prior conversational response to a corresponding instance of the encoder 204).

For the numerical representation of the current conversational user input of interest, the prompt comparator component 206 analyzes the numerical representations of the prior input prompts previously provided to the LLM-based chatbot service 152 to identify a subset of prior input prompts that are semantically similar to the current conversational user input of interest. For example, in one implementation, the prompt comparator component 206 identifies any prior input prompts having a numerical vector representation with a cosine similarity with respect to the numerical vector representation of the current conversational user input of interest for inclusion in the subset of semantically similar prior input prompts. That said, it should be appreciated that any number of different clustering techniques or other algorithms may be utilized to identify a subset of prior input prompts having numerical representations within a desired threshold distance or semantic similarity of the current conversational user input, and the subject matter described herein is not limited to any particular manner for identifying the subset of semantically similar prior input prompts. It should be noted that in some implementations, when the prompt comparator component 206 fails to identify any semantically similar prior input prompts or at least a threshold number of prior input prompts, the prompt comparator component 206 may automatically provide the current conversational user input as an input prompt to the LLM-based chatbot service 152 without further analysis.

After identifying a semantically similar subset of prior input prompts, the prompt comparator component 206 analyzes the numerical representations of the prior conversational responses provided by the LLM-based chatbot service 152 for those input prompts to determine whether the prior conversational responses (or a most recent subset thereof) satisfy a semantic similarity threshold for foregoing use of the LLM-based chatbot service 152. In this manner, the prompt comparator component 206 determines whether or not the current conversational user input is likely to result in a substantially unique or distinct conversational response from the LLM-based chatbot service 152 based on the historical behavior of the LLM-based chatbot service 152 for preceding input prompts that were semantically similar to the current conversational user input. For example, the prompt comparator component 206 may calculate or otherwise determine whether the average cosine similarity between the numerical vector representations of respective pairs of the prior conversational responses is greater than a semantic similarity threshold indicating that the prior conversational responses are substantially the same semantically, or that the semantic content of the respective prior conversational responses varies by less than a threshold amount across conversational responses.

When the prior conversational responses are heterogenous such that the semantic similarity associated with the prior conversational responses for the semantically similar prior input prompts fails to satisfy the semantic similarity threshold, then the prompt comparator component 206 may determine that the current conversational user input is likely to result in a substantially unique or distinct conversational response from the LLM-based chatbot service 152 and automatically provide the current conversational user input as an input prompt to the LLM-based chatbot service 152. The resulting conversational response received from the LLM-based chatbot service 152 is stored or otherwise maintained in association with the current conversational user input as a new LLM response record in the prompt-response log 210 for subsequent reference by the LLM management service 200 for future, semantically similar conversational user inputs.

On the other hand, when the prior conversational responses are substantially homogenous and semantically similar such that the LLM-based chatbot service 152 is unlikely to provide a substantially unique or distinct conversational response to the current conversational user input, the prompt comparator component 206 may automatically provide the current conversational user input and one or more of the prior conversational responses to the response generation component 208 for automatically generating a response that mimics or otherwise emulates the response likely to be provided by the LLM-based chatbot service 152.

The response generation component 208 generally represents the component of the LLM management service 200 that is configurable to utilize NLP techniques to automatically generate a conversational response to the current conversational user input that mimics or otherwise emulates the response likely to be provided by the LLM-based chatbot service 152 by using the textual content of one or more prior conversational responses provided by the LLM-based chatbot service 152 for semantically similar input prompts to construct or otherwise generate a current conversational response that reflects the textual content of the current conversational user input and/or the PII terms that were extracted by the identification masking component 202. For example, the response generation component 208 may utilize parts-of-speech tagging and/or other NLP techniques to analyze the prior conversational responses to identify the intent of the prior conversational responses along with the syntax or structure of the prior conversational responses, and then automatically generate a conversational response (e.g., using generative NLP models) that has substantially the same intent and similar syntax or structure using information derived from the current conversational user input, the extracted PII terms associated with the current conversational user input, and/or other contextual information associated with the current conversational user input (e.g., data or information associated with the particular user, organization, tenant and/or the like). In this manner, the LLM management service 200 may automatically generate an automated response to a received conversational user input that emulates the behavior of the LLM-based chatbot service 152 by using one or more prior conversational responses provided by the LLM-based chatbot service 152 without incurring the costs associated with sending the current conversational user input as an input prompt to the LLM-based chatbot service 152.

The automated response generated by the response generator 208 is transmitted or otherwise provided to the chatbot service 142 for automatically updating the chat window or other GUI display associated with a conversation with the chatbot service 142. In this regard, a graphical representation of the textual content of the automated response may be presented within the chat window or other chat log as an utterance on behalf of the chatbot service 142 that follows the one or more utterances including the textual content of the preceding conversational user input(s) that the automated response is responsive to. In this regard, the autogenerated response may be presented by the chatbot service 142 within the chat window in a manner that is indistinguishable from the manner in which a conversational response from the LLM-based chatbot service 152 would be presented.

Figure 3:
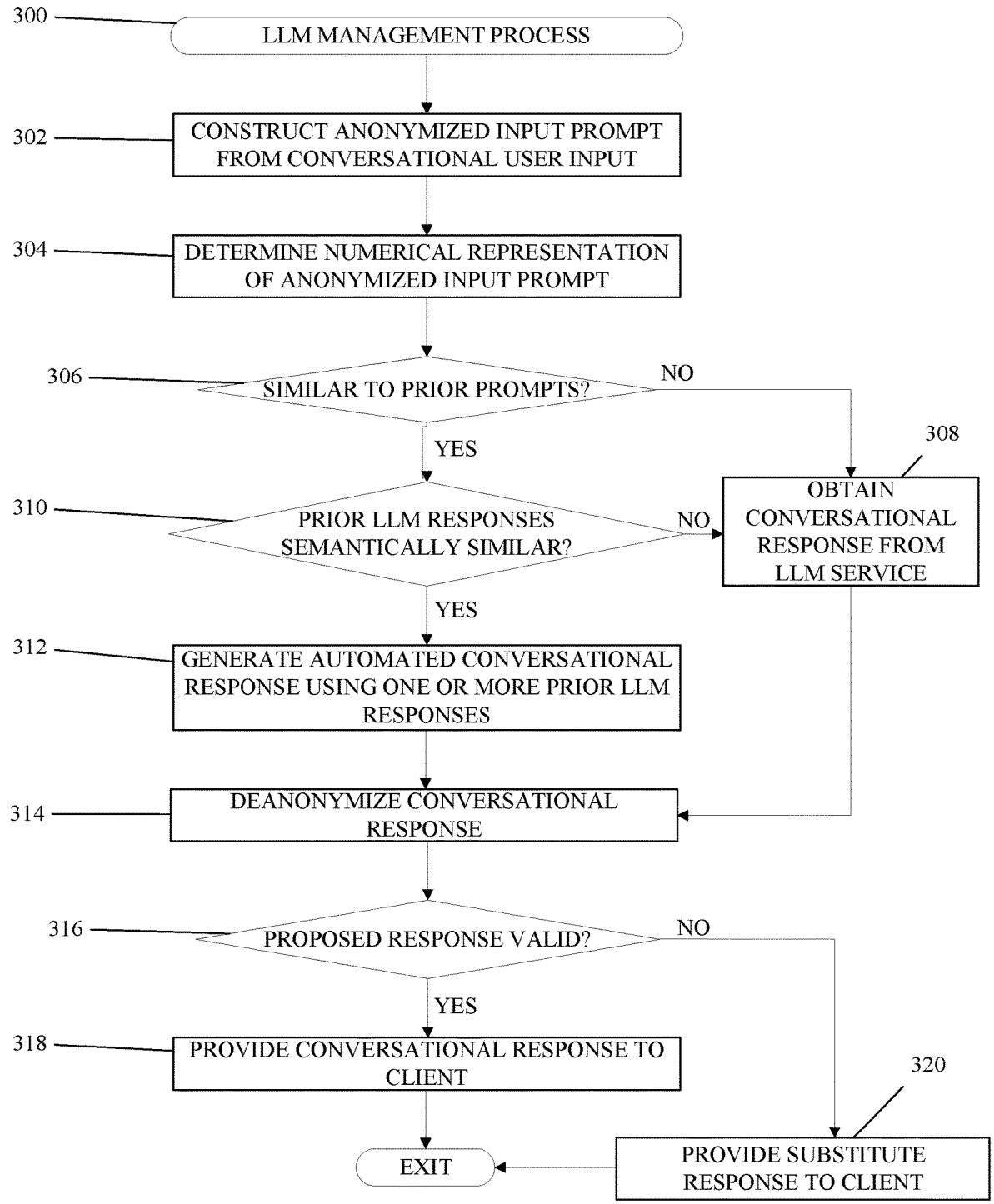
FIG. 3 is a flow diagram illustrating a LLM management process suitable for implementation by the LLM management service of FIG. 2 in the computing system of FIG. 1 in accordance with one or more exemplary implementations.

FIG. 3 depicts an exemplary flow diagram of a LLM management process 300 suitable for implementation by a chatbot service or other service associated with a virtual web application to manage utilization of an LLM-based chatbot service and perform additional tasks, functions, and/or operations described herein. For illustrative purposes, the following description may refer to elements mentioned above in connection with FIGS. 1-2. For purposes of explanation, the LLM management process 300 may be described herein primarily in the context of an LLM management service 200 associated with a chatbot service 142 supported by an application platform 120 that provides virtual web applications 140 to any number of different client devices 108. It should be appreciated that the LLM management process 300 may include any number of additional or alternative tasks, the tasks need not be performed in the illustrated order and/or the tasks may be performed concurrently, and/or the LLM management process 300 may be incorporated into a more comprehensive procedure or process having additional functionality not described in detail herein. Moreover, one or more of the tasks shown and described in the context of FIG. 3 could be omitted from a practical implementation of the LLM management process 300 as long as the intended overall functionality remains intact.

In exemplary implementations, the LLM management process 300 is initiated after it is determined that a conversational user input received in the context of a conversation with a client end user at a client device qualifies as a candidate for an input prompt to be provided to an external LLM-based chatbot service for receiving a conversational response. In this regard, a chatbot service 142 or other software agent associated with the conversation with a user at the client device 108 may analyze the content of the received conversational user input to first verify or otherwise confirm that the chatbot service 142 is unable to answer or respond to the received conversational user input using its own vocabulary, rules, configuration data and/or the like. When the chatbot service 142 is capable of independently responding to the received conversational user input, the chatbot service 142 may automatically respond by generating a conversational response in a conventional manner. When the chatbot service 142 is unable to answer or independently, respond to the received conversational user input, in exemplary implementations, the chatbot service 142 may further verify or otherwise confirm that the received conversational user input relates to subject matter that is appropriate for referring to an external LLM-based chatbot service. In this regard, when the subject matter or content of the received conversational user input is inappropriate or ineligible for referring to an external LLM-based chatbot service (e.g., the conversational user input relates to legal issues and/or the like), the chatbot service 142 may automatically provide a default response to the received conversational user input that has been previously configured for the chatbot service 142 without initiating the LLM management process 300.

When the conversational user input is otherwise eligible for sending to an LLM-based chatbot service, the LLM management process 300 constructs an anonymized candidate input prompt for analysis from the conversational user input by removing any PII terms and/or other textual content that is ineligible for being communicated to the LLM-based chatbot service (task 302). For example, as described above, the identification masking component 202 may remove or replace any PII terms or other terminology or content from the received conversational user input in favor of generic or anonymized placeholder or nonce terms to arrive at an augmented conversational user input that still allows for the LLM-based chatbot service 152 or other NLP techniques to accurately ascertain the intent, syntax, parts-of-speech, semantic content and/or other aspects of the received conversational user input without accessing PII or other information that should be inaccessible to the LLM-based chatbot service 152.

After constructing an anonymized candidate input prompt, the LLM management process 300 determines a numerical representation of the candidate input prompt for evaluating semantic similarity with respect to prior input prompts previously sent to the LLM-based chatbot service (tasks 304, 306). For example, as described above, the candidate input prompt constructed by the identification masking component 202 is input or otherwise provided to an encoder 204 or similar component that is configurable to convert or otherwise transform the candidate input prompt into a corresponding numerical representation. In this regard, a word embedding model, a sentence encoder, or another similar encoding technique may be applied to arrive at a numerical vector representation of the textual content of the anonymized version of the received conversational user input under consideration for submission to the LLM-based chatbot service 152. The numerical representation of the candidate input prompt is compared to the numerical representations of prior input prompts that were previously sent to the LLM-based chatbot service 152 and maintained in the prompt-response log 210 to identify whether a semantically similar subset of prior input prompts exists for the candidate input prompt corresponding to the current conversational user input of interest. For example, the prompt comparator 206 may calculate or otherwise determine the cosine similarity of the numerical vector representation of the current candidate input prompt to the prior input prompts to identify a subset of semantically similar prior input prompts that are within a threshold degree of semantic similarity (e.g., a cosine similarity that is greater than a threshold value indicating the numerical vector representations are within a threshold distance of one another). In the absence of at least a threshold number of prior input prompts that are semantically similar to the current candidate input prompt, the LLM management process 300 automatically proceeds with submitting the current input prompt to the LLM-based chatbot service to receive a corresponding conversational response to the anonymized version of the received conversational user input (task 308).

In one or more exemplary implementations, the LLM management process 300 may utilize metadata or other contextual information associated with the candidate input prompt to further limit or filter the subset of semantically similar prior input prompts, for example, by excluding or removing from the subset any prior input prompts that are less likely to be relevant to the candidate input prompt based on metadata or other contextual information associated with the prior input prompts. For example, in various implementations, the LLM response records stored or otherwise maintained in the prompt-response log 210 may include one or more additional fields of metadata that may be utilized to identify other data records 114 in other tables 112 of the database 106 having different object types or particular values for those object type fields, such that the filtered subset of semantically similar prior input prompts only includes those prior input prompts that relate to other database object types that match a database object type associated with the candidate input prompt. For example, if the current conversation with the chatbot service 142 is associated with a warranty claim for a particular type of product, the LLM management process 300 may utilize metadata or other contextual information to identify the subset of semantically similar prior input prompts that relate to the same type of warranty claim and/or the same type of product by filtering or otherwise excluding semantically similar prior input prompts that relate to a different warranty claim or different product. Furthermore, in some implementations, the LLM management process 300 may filter or otherwise limit the subset of semantically similar prior input prompts based on the particular tenant, organization, or other identifier associated with user providing the candidate input prompt, such that the subset of semantically similar prior input prompts only includes prior input prompts associated with the same tenant, organization, user or the like as the candidate input prompt.

After identifying a subset of semantically similar prior input prompts, the LLM management process 300 continues by analyzing the prior LLM conversational responses associated with those prior input prompts to detect or otherwise identify when the prior LLM conversational responses are semantically similar within a threshold amount (task 310). For example, in some implementations, the prompt comparator 206 may calculate or otherwise determine a silhouette score or other clustering metric based on the numerical vector representations of the prior LLM conversational responses to determine whether the semantic similarity across the prior LLM conversational responses is greater than a threshold value that indicates that the prior LLM conversational responses are substantially homogeneous or otherwise exhibit a degree of semantic similarity such that the LLM-based chatbot service 152 is unlikely to provide a semantically unique or semantically distinct response to the current candidate input prompt under consideration. In this regard, when the prior LLM conversational responses for the semantically similar prior input prompts are heterogeneous or otherwise do not exhibit a threshold level of semantic similarity or homogeneity, the LLM management process 300 automatically proceeds with submitting the current candidate input prompt to the LLM-based chatbot service (task 308). In a similar manner as described above in the context of the prior input prompts, in some implementations, the LLM management process 300 may utilize metadata or other contextual information associated with the candidate input prompt to further limit or filter the subset of prior LLM conversational responses for analysis, for example, by excluding or removing from the subset any prior LLM conversational responses that are less likely to be relevant to the candidate input prompt based on metadata or other contextual information associated with the prior LLM conversational responses.

It should be noted that although the LLM management process 300 may be described herein primarily in the context of identifying and analyzing the respective subsets of prior input prompts and associated LLM conversational responses substantially in real-time, in practice, the respective subsets of semantically similar prior input prompts and LLM conversational responses may be periodically analyzed as part of one or more batched processes performed at the database system 102. For example, process associated with the LLM management service 200 may periodically analyze the prompt-response log 210 to cluster or otherwise group the prior input prompts into semantically similar cluster groups, and then the respective prior LLM conversational responses associated with or otherwise assigned to that cluster group may be analyzed for semantic similarity across the cluster group. In this regard, different cluster groups of semantically similar prior input prompts and their associated prior LLM conversational responses may be analyzed and scored or otherwise assigned one or more values or indicia that indicate whether or not the LLM-based chatbot service 152 is generating heterogeneous or semantically similar conversational responses for that respective cluster group of input prompts. Thereafter, when a candidate input prompt is available, the LLM management service 200 may attempt to assign the candidate input prompt to one of the existing cluster groups (e.g., at 306), and when the candidate input prompt can be assigned to an existing cluster group (e.g., based on cosine similarity or distance between the numerical vector representation of the cluster group and the numerical vector representation of the candidate input prompt), automatically send the candidate input prompt to the LLM-based chatbot service 152 when semantic similarity or homogeneity score assigned to that cluster group indicates the LLM-based chatbot service 152 is exhibiting heterogeneity for input prompts assigned to that cluster group (e.g., at 310).

Additionally, for some implementations, where the number of input prompts or responses assigned to a particular cluster group exceeds some threshold, the LLM management service 200 may randomly sample or select respective ones of the particular cluster group rather than analyzing all of the prior input prompts or responses to conserve processing resources. For example, in some implementations, the LLM management service 200 may limit analysis for semantic similarity and homogeneity to a most recent subset of prior input prompts and responses within a particular cluster group (e.g., only the prior input prompts and responses received within the preceding week, etc.). In this regard, it should be appreciated that the subject matter described herein is not limited to any particular manner or implementation for identifying and analyzing prior input prompts and prior LLM conversational responses pertaining to a candidate input prompt.

Still referring to FIG. 3, when the prior LLM conversational responses exhibit a desired degree of semantic similarity or homogeneity, the LLM management process 300 automatically constructs or otherwise generates an automated conversational response to be provided to the user responsive to the received conversational user input using one or more of the prior LLM conversational responses (task 312). As described above, when the prompt comparator 206 determines the prior LLM conversational responses are sufficiently similar semantically, the prompt comparator 206 may provide the candidate input prompt along with one or more of the prior LLM conversational responses to the response generation component 208. The response generation component 208 may utilize generative NLP techniques to automatically construct a candidate conversational response having substantially similar intent, syntax and/or structure to one or more of the prior LLM conversational responses. In this regard, the automated conversational response generated by the LLM management service 200 may mimic or otherwise emulate the response behavior of the LLM-based chatbot service 152 without sending the candidate input prompt to the LLM-based chatbot service 152. For purposes of explanation, the automated conversational response generated by the LLM management service 200 may alternatively be referred to herein as a synthetic LLM chatbot response.

In the illustrated implementation, the LLM management process 300 deanonymizes or otherwise augments the candidate conversational response to restore relevant PII or other information that was otherwise obfuscated or removed from the input prompt and then analyzes the proposed conversational response to verify or otherwise confirm that the proposed conversational response is valid or otherwise acceptable prior to providing the proposed conversational response to the user at the client device (tasks 314, 316, 318). In this regard, when the proposed conversational response invalid, inappropriate or otherwise unacceptable, the LLM management process 300 may provide a substitute response to the conversational user input to the client in lieu of any autogenerated response (task 320).

For example, as described above, the response generation component 208 may utilize NLP techniques in concert with information from the identification masking component 202 identifying any PII terms or other information removed from the conversational user input when constructing the input prompt to augment or otherwise supplement the proposed conversational response generated based on the prior LLM conversational responses such that the resulting automated conversational response generated by the LLM management service 200 better reflects the content of the received conversational user input. In a similar manner, the response generation component 208 may augment or otherwise supplement responses received from the LLM-based chatbot service 152 (e.g., as a result of sending the candidate input prompt at task 308) to reflect the content of the received conversational user input that triggered the response. Thereafter, the response generation component 208 at the LLM management service 200 may apply one or more validation rules to the conversational response to verify or otherwise confirm that the proposed conversational response satisfies any validation criteria prior to communicating the conversational response back to the user.

In one or more exemplary implementations, after applying any applicable validation rules, the proposed conversational response may be provided to another instance of the client device 108 for validation or verification by another user to provide human-in-the-loop validation of any automatically generated conversational response (e.g., for safety, security, legal compliance, and/or the like), prior to providing the conversational response to the user of the client device 108. In this regard, in some implementations, when the user supervising the LLM management service 200 is unsatisfied with a synthetic LLM chatbot response that was generated by the LLM management service 200, the supervising user may manually override the LLM management service 200 by sending the candidate input prompt to the LLM-based chatbot service 152 to generate a corresponding response in lieu of the synthetic LLM chatbot response generated by the LLM management service 200. In such implementations, the LLM management process 300 may provide one or more GUI displays or GUI elements that allow the supervising user to arbitrate or otherwise select the preferred response from among the synthetic LLM chatbot response that was generated by the LLM management service 200 and any conversational response received from the LLM-based chatbot service 152. Additionally, in some implementations, when the supervising user identifies or otherwise determines that any conversational responses received from the LLM-based chatbot service 152 for a particular input prompt are inaccurate or otherwise inappropriate, the LLM management process 300 may provide one or more GUI displays or GUI elements that allow the supervising user to flag, tag, mark or otherwise designate the input prompt or corresponding conversational user input as one that the LLM-based chatbot service 152 should not be employed for. Thereafter, in response to subsequently received conversational user inputs that are semantically similar to any flagged input prompt, the LLM management service 200 may automatically determine the subject matter or content of the received conversational user input is inappropriate or ineligible for referring to an external LLM-based chatbot service and automatically provide a default response to the received conversational user input that has been previously configured for the chatbot service 142 without initiating the LLM management process 300.

In response to receiving indicia from another user validating the synthetic LLM chatbot response generated by the LLM management service 200, the LLM management service 200 may automatically communicate or otherwise provide the textual content of the synthetic LLM chatbot response to the chatbot service 142, which, in turn utilizes the received textual content to dynamically update the conversation at the client device 108. For example, in exemplary implementations, the chatbot service 142 dynamically updates the graphical representation of the conversation depicted within the chat window or other user interface associated with the virtual application 140 to include a graphical representation of the textual content of the synthetic LLM chatbot response as an utterance on behalf of the chatbot service 142 that is responsive to or otherwise follows the one or more utterances associated with the user that contain the conversational user input that formed the basis of the input prompt that the synthetic LLM chatbot response is responsive to. In this manner, the user of the client device 108 may perceive the received conversational response as having emanated from the chatbot service 142 and/or the LLM-based chatbot service 152 without realization that the depicted conversational response was synthetically constructed and automatically generated based on prior responses by the LLM-based chatbot service 152 to one or more semantically similar prior prompts that were previously submitted or otherwise input to the LLM-based chatbot service 152 on behalf of other users.

By virtue of the LLM management service 200 and the LLM management process 300 described herein, LLM-related costs may be reduced by determining whether the LLM is generating substantially homogeneous or semantically similar response to similar input prompts. In this regard, when a chatbot service encounters a particular input prompt or event where it is likely that an LLM will arrive at a homogeneous response semantically similar to prior responses, the chatbot service may forego sending that input prompt to the LLM until the LLM is retrained, changed or otherwise updated. In such scenarios, a prior conversational response from the LLM may be utilized as a template from which a candidate conversational response can be constructed by adding PII or other metadata or information pertaining to the current conversation or event, and provide the autogenerated synthetic conversational response to the user rather than utilizing LLM credits or otherwise incurring costs associated with LLM usage. For example, for a received conversational user input from a customer trying to submit a warranty claim for a particular product where the warranty claim has expired, the LLM management service 200 may automatically identify semantically similar prior input prompts that relate to the same or similar type of warranty claim and/or product. When the prior LLM conversational responses to those prior input prompts are substantially homogeneous and semantically similar, the LLM management service 200 may automatically utilize one or more of the prior LLM conversational responses to construct a synthetic LLM response that can be populated, supplemented or otherwise augmented using the customer name, product details and/or other PII pertaining to the customer trying to submit the warranty claim.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as services) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
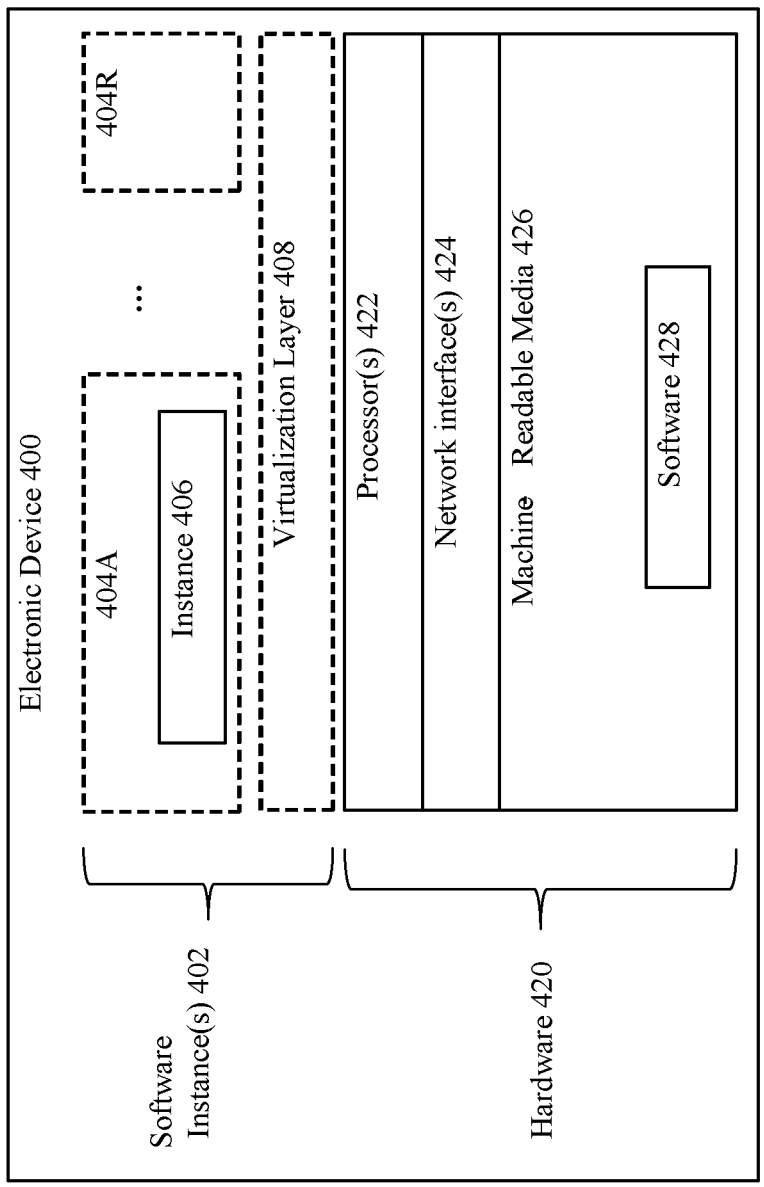
FIG. 4A is a block diagram illustrating an electronic device according to some exemplary implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients, server-side services (e.g., chatbot service 142, LLM management service 200, etc.) and client-side services may be implemented in one or more electronic devices 400. In one implementation: 1) each of the clients is implemented in a separate one of the electronic devices 400 (e.g., in end user devices where the software 428 represents the software to implement clients to interface directly and/or indirectly with the server-side services and/or client-side services (e.g., software 428 represents a web browser, a native client, a portal, a command-line interface, and/or an application programming interface (API) based upon protocols such as Simple Object Access Protocol (SOAP), Representational State Transfer (REST), etc.)); 2) the server-side services and/or client-side services is implemented in a separate set of one or more of the electronic devices 400 (e.g., a set of one or more server devices where the software 428 represents the software to implement the server-side services and/or client-side services); and 3) in operation, the electronic devices implementing the clients and the server-side services and/or client-side services would be communicatively coupled (e.g., by a network) and would establish between them (or through one or more other layers and/or or other services) connections for submitting requests to the server-side services and/or client-side services. Other configurations of electronic devices may be used in other implementations.

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where computer virtualization is used, during operation, an instance of the software 428 is executed within the software container 404A on the virtualization layer 408. In electronic devices where computer virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Figure 4B:
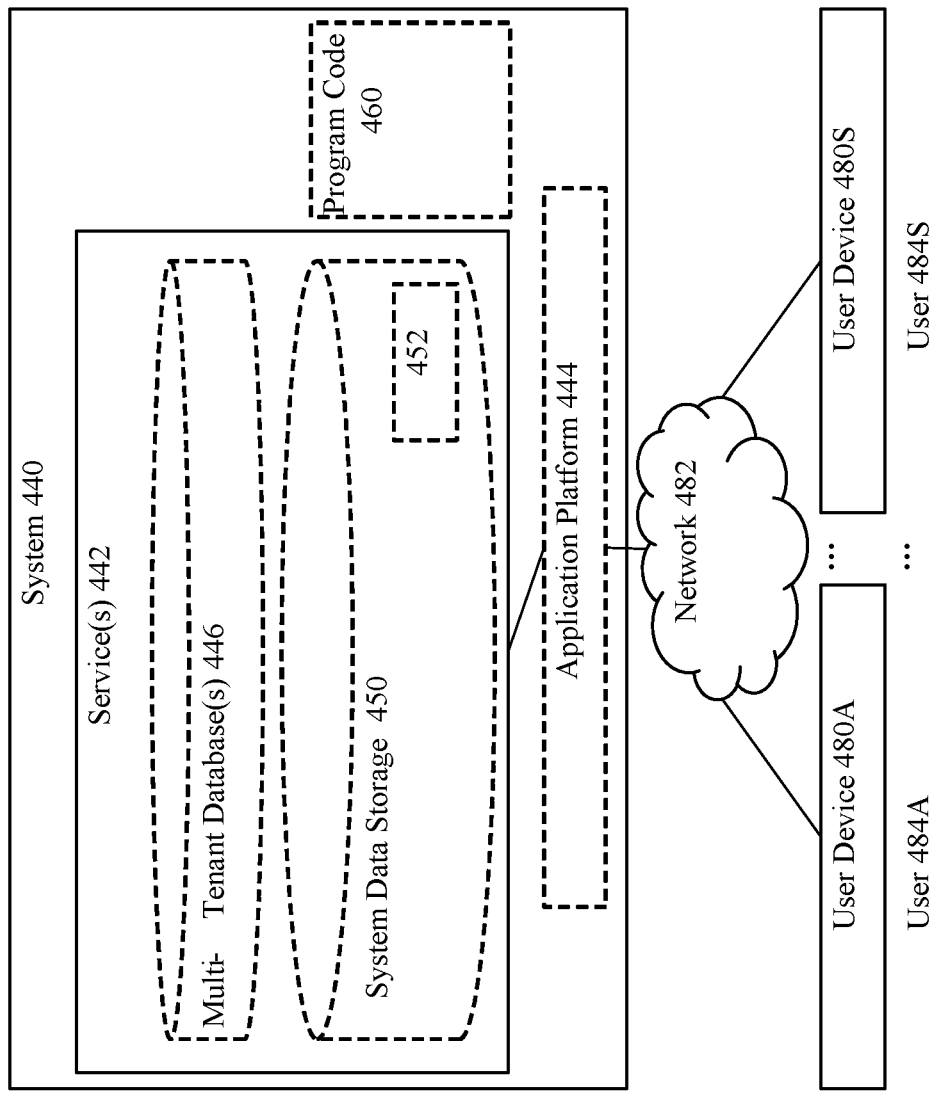
FIG. 4B is a block diagram of a deployment environment according to some exemplary implementations.

FIG. 4B is a block diagram of a deployment environment according to some example implementations. A system 440 includes hardware (e.g., a set of one or more server devices) and software to provide service(s) 442, including server-side services and/or client-side services. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 440 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the server-side services and/or client-side services, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP) or HTTP Secure (HTTPS), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method comprising:
   determining a numerical representation of a conversational input to a user interface;
   identifying, based at least in part on the numerical representation of the conversational input, a semantically similar subset of prior conversational inputs previously sent to a large language model-based (LLM-based) service from a plurality of prior conversational inputs having associated conversational responses maintained at a database system, wherein a respective prior conversational input of the semantically similar subset has a respective conversational response generated by the LLM-based service responsive to the respective prior conversational input associated therewith, resulting an associated subset of prior conversational responses provided by the LLM-based service responsive to the semantically similar subset of prior conversational inputs;

determining numerical representations of the respective conversational responses of the associated subset of prior conversational responses provided by the LLM-based service; and when the numerical representations of the respective conversational responses satisfy a semantic similarity threshold for homogeneity across the prior conversational responses provided by the LLM-based service:

automatically generating a synthetic LLM response to the conversational input based at least in part on one or more prior conversational responses of the associated subset of prior conversational responses provided by the LLM-based service responsive to the semantically similar subset of prior conversational inputs; and automatically providing the synthetic LLM response to the user interface responsive to the conversational input.

2. The method of claim 1, further comprising removing personal identifying information from the conversational input prior to determining the numerical representation of the conversational input.

3. The method of claim 2, further comprising supplementing the synthetic LLM response with the personal identifying information prior to automatically the automated synthetic LLM response to the user interface.

4. The method of claim 1, wherein identifying the semantically similar subset of prior conversational inputs comprises identifying a cluster group of prior input prompts previously sent to the LLM-based service having respective numerical representations semantically similar to the numerical representation of the conversational input.

5. The method of claim 1, further comprising filtering the semantically similar subset of prior conversational inputs based at least in part on contextual information associated with the conversational input prior to identifying the associated subset of prior conversational responses.

6. The method of claim 5, wherein the contextual information includes at least one of an identifier associated with a user providing the conversational input and a database object type associated with the conversational input.

7. At least one non-transitory machine-readable storage medium that provides instructions that, when executed by at least one processor, are configurable to cause the at least one processor to perform operations comprising:

determining a numerical representation of a conversational input to a user interface;

identifying, based at least in part on the numerical representation of the conversational input, a semantically similar subset of prior conversational inputs previously sent to a large language model-based (LLM-based) service from a plurality of prior conversational inputs having associated conversational responses maintained at a database system, wherein a respective prior conversational input of the semantically similar subset has a respective conversational response generated by the LLM-based service responsive to the respective prior conversational input associated therewith, resulting an associated subset of prior conversational responses provided by the LLM-based service responsive to the semantically similar subset of prior conversational inputs;

determining numerical representations of the respective conversational responses of the associated subset of prior conversational responses provided by the LLM-based service; and when the numerical representations of the respective conversational responses satisfy a semantic similarity threshold for homogeneity across the prior conversational responses provided by the LLM-based service:

automatically generating a synthetic LLM response to the conversational input based at least in part on one or more prior conversational responses of the associated subset of prior conversational responses provided by the LLM-based service responsive to the semantically similar subset of prior conversational inputs; and automatically providing the synthetic LLM response to the user interface responsive to the conversational input.

8. The at least one non-transitory machine-readable storage medium of claim 7, wherein the instructions are configurable to cause the at least one processor to remove personal identifying information from the conversational input prior to determining the numerical representation of the conversational input.

9. The at least one non-transitory machine-readable storage medium of claim 8, wherein the instructions are configurable to cause the at least one processor to supplement the synthetic LLM response with the personal identifying information prior to automatically providing the synthetic LLM response to the user interface.

10. The at least one non-transitory machine-readable storage medium of claim 7, wherein:

the semantically similar subset of prior conversational inputs comprises a subset of prior input prompts previously sent to the LLM-based service; and the associated subset of prior conversational responses comprises conversational responses provided by the LLM-based service in response to receiving respective ones of the subset of prior input prompts.

11. The at least one non-transitory machine-readable storage medium of claim 7, wherein the instructions are configurable to cause the at least one processor to identify a cluster group of prior input prompts previously sent to the LLM-based service having respective numerical representations semantically similar to the numerical representation of the conversational input.

12. The at least one non-transitory machine-readable storage medium of claim 7, wherein the instructions are configurable to cause the at least one processor to filter the semantically similar subset of prior conversational inputs based at least in part on contextual information associated with the conversational input prior to identifying the associated subset of prior conversational responses.

13. The at least one non-transitory machine-readable storage medium of claim 12, wherein the contextual information includes at least one of an identifier associated with a user providing the conversational input and a database object type associated with the conversational input.

14. A computing system comprising:

at least one non-transitory machine-readable storage medium that stores software; and at least one processor, coupled to the at least one non-transitory machine-readable storage medium, to execute the software that implements a large language model (LLM) management service and that is configurable to perform operations comprising:

determining a numerical representation of a conversational input to a user interface;

identifying, based at least in part on the numerical representation of the conversational input, a semantically similar subset of prior conversational inputs previously sent to an LLM-based service from a plurality of prior conversational inputs having associated conversational responses maintained at a database system, wherein a respective prior conversational input of the semantically similar subset has a respective conversational response generated by the LLM-based service responsive to the respective prior conversational input associated therewith, resulting an associated subset of prior conversational responses provided by the LLM-based service responsive to the semantically similar subset of prior conversational inputs;

determining numerical representations of the respective conversational responses of the associated subset of prior conversational responses provided by the LLM-based service; and when the numerical representations of the respective conversational responses satisfy a semantic similarity threshold for homogeneity across the prior conversational responses provided by the LLM-based service:
  automatically generating a synthetic LLM response to the conversational input based at least in part on one or more prior conversational responses of the associated subset of prior conversational responses provided by the LLM-based service responsive to the semantically similar subset of prior conversational inputs; and
  automatically providing the synthetic LLM response to the user interface responsive to the conversational input.

15. The computing system of claim 14, wherein the LLM management service is configurable to:
  remove personal identifying information from the conversational input prior to determining the numerical representation of the conversational input; and
  supplement the synthetic LLM response with the personal identifying information prior to automatically providing the synthetic LLM response to the user interface.

16. The computing system of claim 14, wherein the LLM management service is configurable to filter the semantically similar subset of prior conversational inputs based at least in part on contextual information associated with the conversational input prior to identifying the conversational responses provided by the LLM-based service in response to receiving respective ones of a filtered semantically similar subset of prior conversational inputs.

17. The method of claim 1, wherein:
  the semantically similar subset of prior conversational inputs comprises a subset of prior input prompts previously sent to the LLM-based service;
  each prior input prompt of the subset of prior input prompts has a respective numerical representation within a threshold similarity of the numerical representation of the conversational input;
  each prior input prompt of the subset of prior input prompts has a respective conversational response by the LLM-based service in response to receiving the respective prior input prompts; and
  the associated subset of prior conversational responses comprises the respective conversational responses provided by the LLM-based service in response to receiving respective ones of the subset of prior input prompts.

18. The method of claim 1, wherein:
  the conversational input and the prior conversational inputs are unstructured and free form using natural language; and
  numerical representations of respective prior conversational inputs of the semantically similar subset of prior conversational inputs are within a threshold degree of similarity of the numerical representation of the conversational input.

19. The method of claim 1, further comprising filtering the prior conversational inputs previously sent to the LLM-based service based at least in part on a database object type associated with the conversational input to obtain the semantically similar subset of prior conversational inputs by removing a second subset of the prior conversational inputs relating to a different database object type than the database object type.

20. The method of claim 1, further comprising filtering the prior conversational inputs previously sent to the LLM-based service based at least in part on an identifier associated with a user providing the conversational input to remove a second subset of the prior conversational inputs and obtain the semantically similar subset of prior conversational inputs associated with a same tenant, organization or user as the conversational input.

* * * * *